United States Patent [19]

Held

[11] 4,130,619

[45] Dec. 19, 1978

[54] APPARATUS AND METHOD OF MAKING HOLLOW ARTICLES

[75] Inventor: Franklin W. Held, San Diego, Calif.

[73] Assignee: Ektelon, San Diego, Calif.

[21] Appl. No.: 806,997

[22] Filed: Jun. 16, 1977

[51] Int. Cl.² .................. B29C 5/00; B29C 17/00; B29H 7/02

[52] U.S. Cl. .................. 264/162; 156/245; 156/304; 264/248; 264/250; 264/265; 264/296; 425/384; 425/407

[58] Field of Search .............. 264/161, 162, 248, 265, 264/250, 296; 425/384, 407; 156/245, 304, 306

[56] References Cited

U.S. PATENT DOCUMENTS

| | | | |
|---|---|---|---|
| 1,400,146 | 12/1921 | Eggers et al. | 264/248 |
| 1,574,113 | 2/1926 | Roberts | 264/248 |
| 2,726,925 | 12/1955 | Saulino | 264/248 |
| 3,709,967 | 1/1973 | Held | 264/248 |
| 3,832,437 | 8/1974 | Taylor | 264/248 |
| 3,933,967 | 1/1976 | Taylor | 264/248 |

Primary Examiner—W.E. Hoag

Attorney, Agent, or Firm—Oldham, Oldham, Hudak & Weber

[57] ABSTRACT

This invention is directed toward making hollow racquet ball balls. This is accomplished by molding a mass of vulcanizable elastic material to hollow semi-spherical form and heating the bulk of the material substantially fully to vulcanize it while simultaneously cooling a portion around the full edge so it is only partially vulcanized at the edge area thereof. Then two of such semi-spherical forms have the edges thereof abutted under some pressure to force the uncured edges together, and heat is then applied to the uncured edges of each half to fully vulcanize them and bind them together to form a unitary seamless ball thereform.

Apparatus for forming the balls includes mold means defining a hollow semi-spherical cavity with a cooling chamber being provided at the open edge of the cavity that defines an edge of the formed hollow half sphere whereby a cooling medium can be circulated at the edge to prevent vulcanization thereof while the remaining part of the hollow half sphere is heated and vulcanized.

11 Claims, 6 Drawing Figures

APPARATUS AND METHOD OF MAKING HOLLOW ARTICLES

BACKGROUND OF INVENTION

Heretofore, hollow elastic balls have been made by a variety of processes using different types of apparatus and molding and vulcanizing procedures. Some of these procedures have involved molding semi-spherical hollow halves and thereafter cementing the edges of two abutted halves together. Or, two formed semi-spherical halves are put into spherical shape in a mold by abutting the edges thereof and then the edges can be bonded together by an adhesive between the halves.

In making hollow spherical articles, it is difficult to obtain strong bonds between independently shaped semi-spherical articles, and it also has been difficult to provide a substantially balanced balls without seams inside or outside the hollow ball by known ball making techniques.

It is the general object of the present invention to provide a novel apparatus and method of making hollow spherical balls of vulcanizable materials, and to form such balls from specially vulcanized hollow semi-spherical article shapes.

Another object of the invention is to prevent vulcanization of the edge portion of a semi-spherical elastomeric article when it is in a mold and is heated for vulcanization of the article.

Another object of the invention is to provide an improved apparatus for maintaining an edge portion of a hollow semi-spherical article in a mold cavity cool while vulcanizing the remainder of the semi-spherical article.

Yet other objects of the invention are to provide a novel and improved, relatively uncomplicated and positive method of forming a hollow ball having a sturdy bond between preformed halves of the hollow article.

The foregoing and other objects and advantages of the invention will be made more apparent as the specification proceeds.

Attention now is particularly directed to the accompanying drawings, wherein.

When referring to corresponding members shown in the drawings and referred to in the specification, corresponding numerals are used to facilitate comparison therebetween.

SUBJECT MATTER OF INVENTON

A method of making hollow articles from vulcanizable elastic material comprising molding masses of the material to hollow semi-spherical form, heating the mass of elastic material, simultaneously cooling the edge of the semi-sphere of the elastic material, and continuing this heating and cooling action until the mass of elastic material is vulcanized while the continuous edge portion and the underlying material is not fully vulcanized. Next, the semi-sphere is removed from the mold, cooled and buffed at the edges of the semi-spheres to roughen the same. This is followed by abutting the edges of two semi-spheres and pressing them together while heating at least the edge portions to vulcanize the edge portions of the semi-spheres, bond the edges together and form a hollow sphere.

The invention also relates to apparatus for molding and vulcanizing hollow semi-spherical articles and it includes mold members defining a uniform, hollow, semi-spherical article cavity, and an annular cooling member is provided in operative association with the mold members to abut on the circular edge of the cavity for receiving a cooling medium therein. Heating means are provided for the remainder of the mold members whereby a simultaneous vulcanization action in one area and a cooling action in another area of the mold cavity can be obtained.

Figure 1:
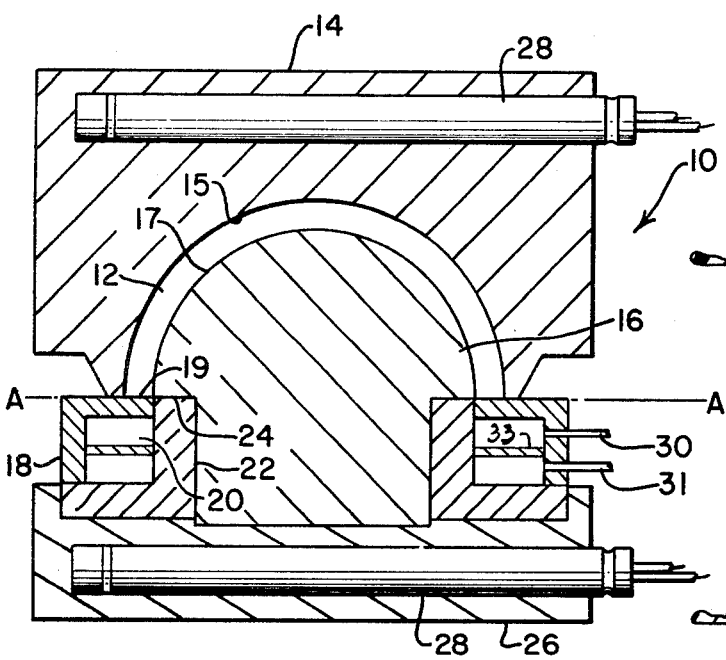
FIG. 1 is a vertical sectional view through a mold used in forming a hollow semi-spherical article of the invention.
Figure 2:
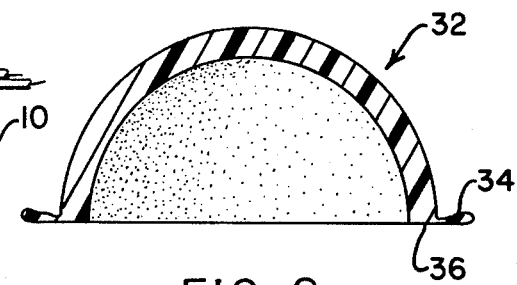
FIG. 2 is a sectional view of the article produced in the mold of FIG. 1.
Figure 3:
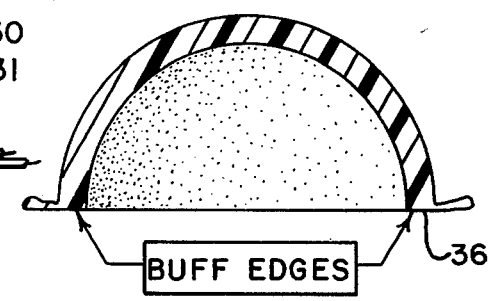
FIG. 3 is a diagrammatic view showing the next step in the method of the invention using the article shown in FIG. 2.

Reference now is made to the details of the construction shown in the accompanying drawings, and a mold is indicated as a whole by the numeral 10 in FIG. 1. This mold 10 comprises mold members that define a uniform thin walled, hollow semi-spherical article cavity 12 therein. This is formed by an outer or upper mold section 14 that has a concave wall 15 therein and a lower mold section 16 that has a spherical surface 17 thereon complementary to but spaced from the cavity surface 15 of the upper mold section. Such semi-spherical mold cavity 12 has an open lower end that is closed by means of a cooling ring or device 18 which has a flat upper surface 19. The upper mold section 14 does not engage the surface 19. There is a gap of about 0.005 to 0.010 inch to allow a shield of insulating rubber to be squeezed out during molding as shown by the numeral 34 in FIG. 2.

A cooling chamber 20 is formed in combination with the cooling ring 18 by a suitable device such as an insulation ring 22. This insulation ring 22 conforms to and operatively engages a shoulder 24 forming the lower end of the lower mold section 16, and abuts thereagainst as well as operatively engaging with associated portions of the cooling ring 18 to form a fluid tight enclosure therewith. Any suitable sealing means (not shown) can be associated with these members 18 and 22 to form a liquid tight enclosure therewith.

A mold plate 26 is shown in operative engagement with the lower mold section 16 and the insulation ring 22 to position these members and control unitary movement thereof. A parting line A—A is indicated in the drawing to show where the mold sections 14 and 16 separate and are moved vertically with relation to each other for charging the mold or for discharging an article therefrom, as desired.

Conventional heaters 28 engage the upper mold 14 and the mold plate 26, and remain operatively engaged therewith for heating the same under controlled temperature conditions. The molds normally are heated to operating temperature before placing vulcanizable materials therein.

Any suitable cooling fluid supply tube 30 can connect to the cooling ring 18 for a flow of cooling medium thereto and an exhaust tube 31 controls flow of coolant from the chamber 20.

Now, in use of the mold of FIG. 1, a suitable ball forming composition is made from vulcanizable elastic materials and conventional compounding ingredients, whereby any known elastomers, natural and synthetic rubbers and similar materials can be mixed with known materials and be formed into suitable size pellets or disc one or more of which would be placed within the mold cavity 12 prior to bringing the upper and lower mold sections into operative engagement with each other. Thus, for example, the molding composition used can be satisfactorily cured in the mold 10 in about 3 minutes at 260°. However, at the same time, a satisfactory volume and quantity of cooling water is flowed through the mold cooling chamber 20 so as to prevent full curing of the area of the article 32 being formed in the mold cavity at the mold parting line or, i.e., the edge of this semi-spherical hollow article being produced.

After the article formed in the cavity 12 is vulcanized, the mold members are broken apart in a conventional manner, the article stripped therefrom and cooled. Any suitable mold cleaning or coating compositions can be used on the mold surfaces.

When this molded semi-spherical hollow article 32 is removed from the mold 10, it normally would have some mold flash 34 extending therefrom. After this article 32 has been cooled, edges 36 of the article at the parting line thereof, are buffed or roughened slightly and then two of these semi-spherical articles have their edges 36 brought together with some slight axial compression therebetween. The axial compression is important to achieve a good vulcanization between the halves to produce the seamless ball. Further the compression is of an amount so that no bead forms on the interior of the ball during final vulcanization and hence when the exterior is buffed, a true seamless ball with uniform thickness walls is the result. Also, of course, it should be understood that the density of the elastic material is uniform throughout the ball since the same amount of vulcanization takes place on all parts of the ball when the process is completed.

Figure 4:
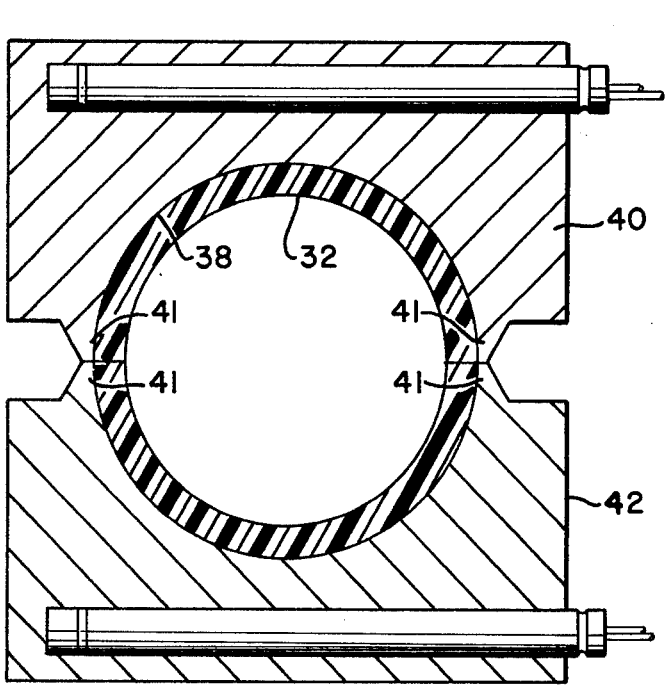
FIG. 4 is a vertical section through a mold and an article in it received therein and indicating the article forming action of the invention.
Figure 5:
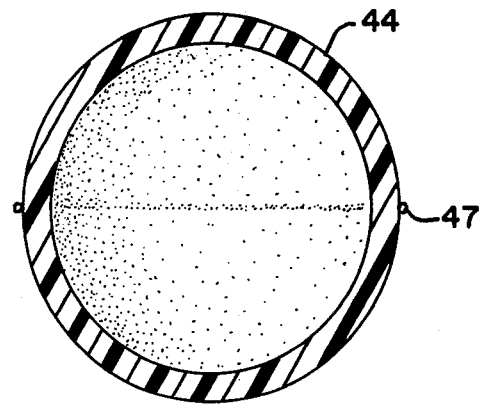
FIG. 5 is a vertical section through a ball made by the process of the invention.
Figure 6:
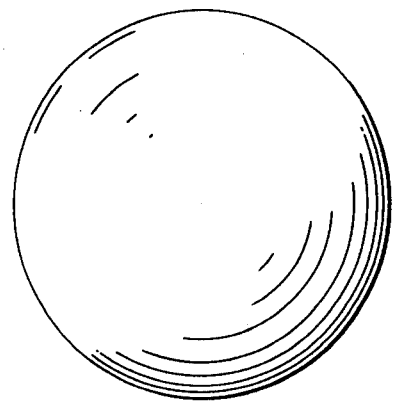
FIG. 6 is an elevation of the ball of FIG. 5 after it has been ground to final size and shape.

Thus, the articles 32 are placed within cavities 38 formed in each of a pair of companion mating mold members 40 and 42, which cavities 38 usually are slightly smaller than the cavity 12 to compensate for some shrinkage of the molded product. When bringing the mold members 40 and 42 together, normally there is some trimming action provided by the mold members having a sharp edge as indicated at 41 in FIG. 4 of the drawings, to remove the mold flash 34 from the articles and provide a relatively smooth surface on the hollow molded article 44 produced from the molds 40 and 42.

Suitable heating means 46 are provided in the molds 40 and 42 and a final cure of this article 44 is obtained, for example, at about 4 minutes and 30 seconds at 275° F.

Naturally, in using the molds of the invention, some conventional compression pressures are exerted thereon so that about 2,000 to 2,500 psi pressures may be exerted on the molds.

Usually the fluid circulated in the cooling chamber 20 would be at about 185° F., and it is circulated at a sufficiently rapid flow rate as to maintain the mass of vulcanizable compound thereadjacent at the parting line in the molds at a low enough temperature as to prevent full vulcanization results whereby it is possible by practice of the present invention to secure two semi-spherical articles 32 together without any adhesive and obtain an effective permanent bond between the semi-spherical articles.

In order to determine the operating conditions for the method of the invention, it may be desirable to test the semi-spherical articles 32 at their edges 36 to determine if such edge portions are unvulcanized. Thus, a conventional cylindrical probe having a diameter of about 0.050 inch is forced under slight manual pressure into the edge 36 and removed to form a hole in the edge. If this hole closes quickly as in about one to two seconds when the probe is removed and, if the probe can be only pushed in easily for about 1/10th of an inch, then that indicates that such area of the article does comprise unvulcanized material so that the composition used and curing temperatures are satisfactory. But, if the probe pushes in more than about 1/10th of an inch and the hole formed thereby closes rather slowly, that indicates that the unvulcanized edge area is too deep and cure conditions can be increased in either time or temperature. If this edge portion 36 of the article 32 resists any penetration at all by the probe, that indicates a substantially fully cured condition in that portion of the ball or article so that curing conditions and temperatures should be reduced.

The article 44 may have a small edge rind 47 thereon as initially molded and, thus, the finished article is provided by grinding off this edge rind and providing any other desirable rounding action on the article 44 to provide the finished product.

It is preferable to have the cooling fluid enter and leave the cooling chamber at about the same point. Also, the incoming fluid should flow along the upper wall of this cooling chamber 20 for maximum cooling action. Any suitable baffle and flow control means 33 can be provided in association with the cooling chamber 20 so that the inlet tube and outlet tubes 30 and 31, respectively, can connect to the same area of the cooling ring 18 and a desired flow path of this cooling fluid through the cooling chamber 20 can be obtained.

By the apparatus and method of this invention, it is submitted that an improved hollow article can be formed from a vulcanizable material and that such material and article produced will have a very good service life and the two components of the ball will remain in effective bonded engagement and airtight relationship to each other for a long service life, even under severe abuse and impacts when the article is used. Thus, it is submitted that the objects of the invention have been achieved.

While one complete embodiment of the invention has been disclosed herein, it will be appreciated that modification of this particular embodiment of the invention may be resorted to without departing from the scope of the invention.

What is claimed is:

1. A method of making hollow articles from a vulcanizable, elastic material comprising the steps of; shaping and molding a mass of the elastic material to a hollow, semi-spherical form in a first mold cavity, heating the mass of elastic material and simultaneously cooling the edge of the semi-sphere of the elastic material, continuing the heating and cooling until the mass of elastic material is vulcanized but the continuous edge portion of the material is not fully vulcanized, removing the semi-sphere from a first mold, roughening said edges of said semi-sphere, transferring two of said semi-spheres to a second mold having a spherical cavity therein, and abutting the edges of said two semi-spheres and forcing the edges together while heating at least the edge portions to vulcanize them together and form a hollow sphere, said first mold including a first mold member having a semi-spherical cavity, a second mold member having a convex semi-spherical portion adapted to mate with said first mold member in spaced relation thereto and an annular cooling means abutting said first mold and said second mold and defining said first mold cavity therebetween, and passing a cooling fluid through said cooling means while heating said second mold, said fluid being insulated from said second mold.

2. A method of making hollow articles as in claim 1, where the abutted edge portions of a pair of the semi-spheres are locally heated for vulcanization thereof and bonding of the two semi-spheres together.

3. A method of making hollow articles as in claim 2, wherein said mold to which said two semi-spheres are transferred is slightly smaller than said vulcanizing mold.

4. A method according to claim 2 where the edges of the two semi-spheres are brought together with axial pressure sufficient to intermix the unvulcanized elastic material in the edge portions whereby upon vulcanization a seamless spherical hollow ball is formed.

5. A method according to claim 4 where the axial pressure is controlled so that vulcanization takes place with a fully uniform contour on the interior of the final cured ball and the wall thickness and density of the ball is uniform throughout.

6. Apparatus for use in molding and vulcanizing hollow semi-spherical articles from vulcanizable materials including a first mold member and a second mold member, said mold members defining a relatively thin walled hollow semi-spherical cavity, said semi-spherical cavity defining a circular edge, a cooling ring and an insulating ring, said cooling ring engaging said insulating ring and forming an annular cooling chamber therebetween, said cooling chamber being located adjacent to said circular edge.

7. An apparatus according to claim 6, wherein said insulating ring insulates said cooling chamber from said lower mold.

8. An apparatus according to claim 7, including a shoulder on said lower mold, said insulating ring engaging said shoulder and abutting thereagainst.

9. An apparatus as in claim 8, including a heating means for heating said upper mold and including a heating means for heating said lower mold.

10. An apparatus according to claim 8, wherein said cooling ring has a flat upper surface, said flat surface of said cooling ring located slightly apart from said upper mold section and forming a gap.

11. An apparatus as in claim 10, wherein said gap ranges from 0.005 to 0.01 inches.

* * * * *